United States Patent [19]

Whitman et al.

[11] Patent Number: 5,655,742
[45] Date of Patent: Aug. 12, 1997

[54] BEVERAGE HOLDER

[76] Inventors: Tom L. Whitman, 5834 Kuldell, Houston, Tex. 77074; Danny E. Swindler, 2404 Messick Loop W., Round Rock, Tex. 78681

[21] Appl. No.: 421,361

[22] Filed: Apr. 12, 1995

[51] Int. Cl.$^6$ .................................................. A47K 1/08
[52] U.S. Cl. ................ 248/311.2; 248/131; 248/222.11; 224/926
[58] Field of Search .................... 248/311.2, 314, 248/346.03, 346.04, 346.05, 346.06, 131, 912, 222.11, 222.12; 224/926

[56] References Cited

U.S. PATENT DOCUMENTS

| | | | |
|---|---|---|---|
| 2,301,216 | 11/1942 | Koontz | 248/346.03 |
| 2,406,334 | 8/1946 | Keller et al. | 248/311.2 |
| 2,805,017 | 9/1957 | Hill et al. | 248/346.04 X |
| 2,910,219 | 10/1959 | Bennett et al. | 248/346.04 X |
| 3,039,616 | 6/1962 | Proffit | 211/71 |
| 3,664,617 | 5/1972 | Fenwick | 248/314 X |
| 4,596,370 | 6/1986 | Adkins | 248/311 |
| 4,634,016 | 1/1987 | Voss | 220/69 |
| 4,819,843 | 4/1989 | Nakayama | 224/42.5 |
| 4,854,468 | 8/1989 | Dahlquist et al. | 220/85 |
| 4,919,381 | 4/1990 | Buist | 248/311.2 X |
| 5,060,899 | 10/1991 | Lorence et al. | 248/311.2 |
| 5,086,958 | 2/1992 | Nagy | 248/311.2 X |
| 5,102,086 | 4/1992 | Thomason | 248/311.2 |
| 5,135,195 | 8/1992 | Dane | 248/311.2 |
| 5,330,145 | 7/1994 | Evans et al. | 248/311.2 |

FOREIGN PATENT DOCUMENTS 6270730 9/1994 Japan ................................. 248/311.2

*Primary Examiner*—Korie Chan
*Attorney, Agent, or Firm*—Gregory M. Luck

[57] ABSTRACT

A beverage holder is disclosed, which holder comprising a base rotatably secured to a body, where the base is removable receivable in a standard beverage tray or rack. In a preferred embodiment, the body is eccentrically attached vis-a-vis the base so as to allow use of the holder where the beverage tray or rack is closely secured to a wall or other fastening surface.

9 Claims, 4 Drawing Sheets

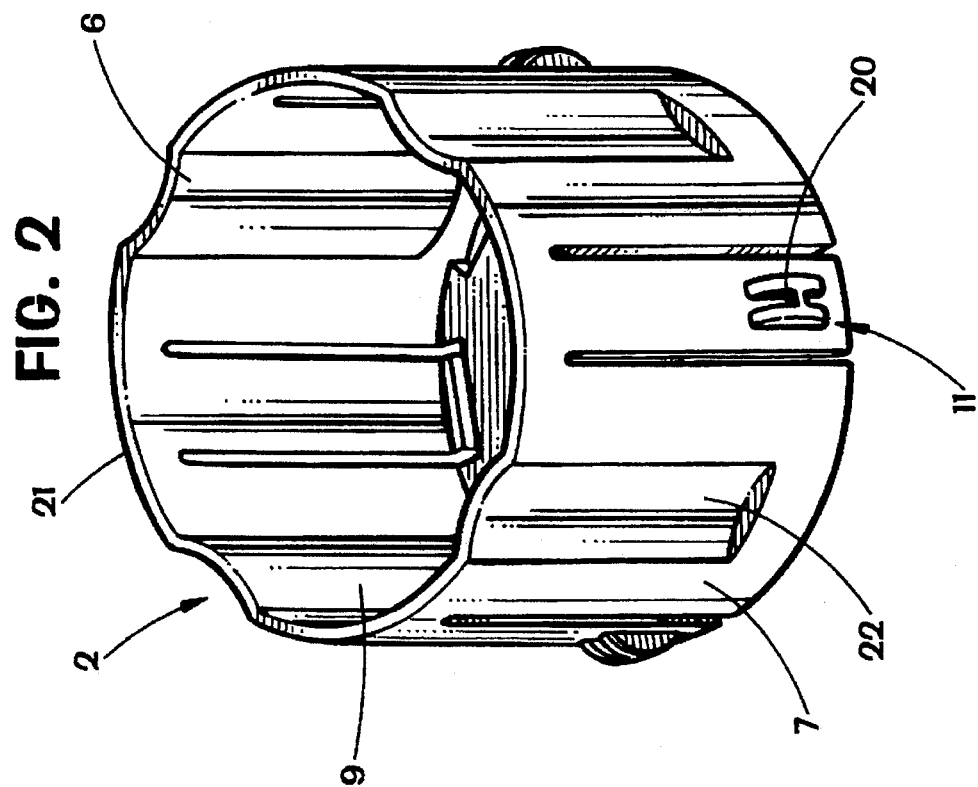
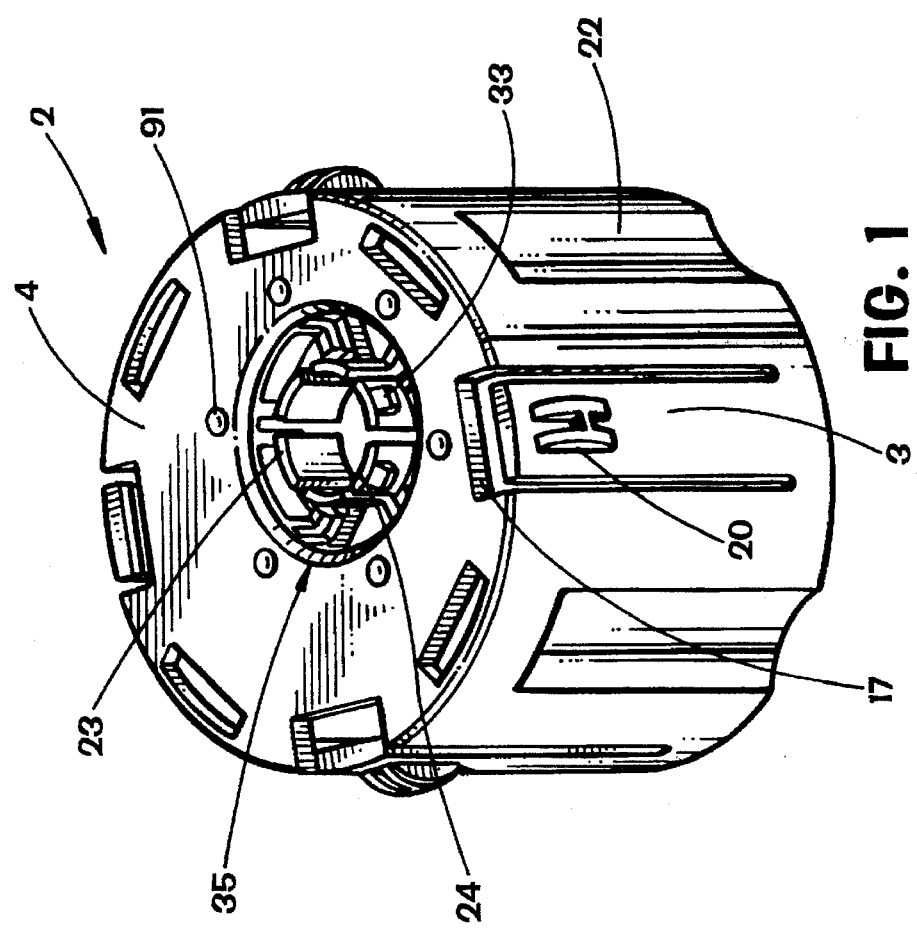

BEVERAGE HOLDER

BACKGROUND OF THE INVENTION

1. Field of the Invention

The present invention generally relates to a device for stabilizing and supporting an oversized cup or can. More specifically, the present invention relates to a support device for holding a cup or can provided with a removable insulation element, where said support element is adapted to fit in an ordinary container or beverage rack in a car, boat or other vehicle, where such beverage rack is otherwise rendered useless when an oversized cup or can provided with an insulation element is utilized.

2. Description of the Prior Art

Some years ago, innovations were made in the insulation of hot and cold beverage containers to allow them to retain a preferred temperature for a longer period of time. This innovation was in the nature of a removable styrofoam or foam rubber sleeve which fits around the body of the container. Such insulation devices have been popularly marketed under a variety of names the most familiar of which is Koozie™. The popularity of convenience stores has also made commonplace the oversized drink container which generally contains 32 or more liquid ounces. These drink containers, while distributed in a variety of sizes, generally have base diameters exceeding 2 and ½ inches.

The above innovation in removable container insulators and oversized containers has rendered useless many beverage receptacles or trays as provided in everything from motor vehicles to golf carts and boats. In this connection, standard drink trays are generally sized to receive a standard aluminum beverage can having a cylindrical shape and diameter of approximately 2 and ½ inches. As a consequence, persons desiring to utilize an insulated beverage or purchase an oversized drink must either forego the use of a standard drink rack, risk spillage by carrying the drink in their lap on the floor or dashboard, or limit the container to standard dimensions altogether.

The wholesale modification of beverage receptacles to accommodate oversized drink containers or containers incorporating an insulating sleeve, however, is usually not practical since such modification would render such receptacles useless for standard sized drink containers. Moreover, the adaptation of drink containers themselves to incorporate a small, average sized base is generally not practical from the standpoint of stability.

In addition to the problem of the unsuitability of wholesale modifications to either the drink receptacle or the containers themselves, yet another impediment to their use and enjoyment is seen in the limited space surrounding the beverage rack or tray. Typically, the standard rack or tray is located and/or attached adjacent to a sidewall which is too closely situated to allow space for a wide top container or a container incorporating an insulating sleeve.

SUMMARY OF THE INVENTION

The present invention addresses the above and other disadvantages of beverage container holders adapted to receive a standard sized container. The beverage holder of the present invention comprises a base adapted to fit in a conventional beverage receptacle or tray, and a body adapted to receive an oversized beverage container. The body is preferably eccentrically mounted to the base so as to allow the two part unit to fit within a conventional receptacle mounting bracket which is itself fitted to a wall, dash or other area where space is a concern.

The present invention therefore offers a number of advantages over the art including the benefit of allowing the use of an existing conventional beverage receptacles or trays even when an insulated or oversized beverage container is preferred by the user. Another advantage includes the ability to use an oversized or insulated beverage container even when the beverage receptacle or tray is mounted in close proximity to a car dash or other mounting surface.

Other advantages and benefits of the present invention will become apparent to those skilled in the art based upon the following drawings and description of the preferred embodiments.

BRIEF DESCRIPTION OF THE DRAWINGS

FIG. 1 is an isometric view of the top of the mounting base of one embodiment of the present invention.

FIG. 2 is an isometric view of the bottom of the mounting base illustrated in FIG. 1.

DETAILED DESCRIPTION OF THE PREFERRED EMBODIMENT

Figure 4:
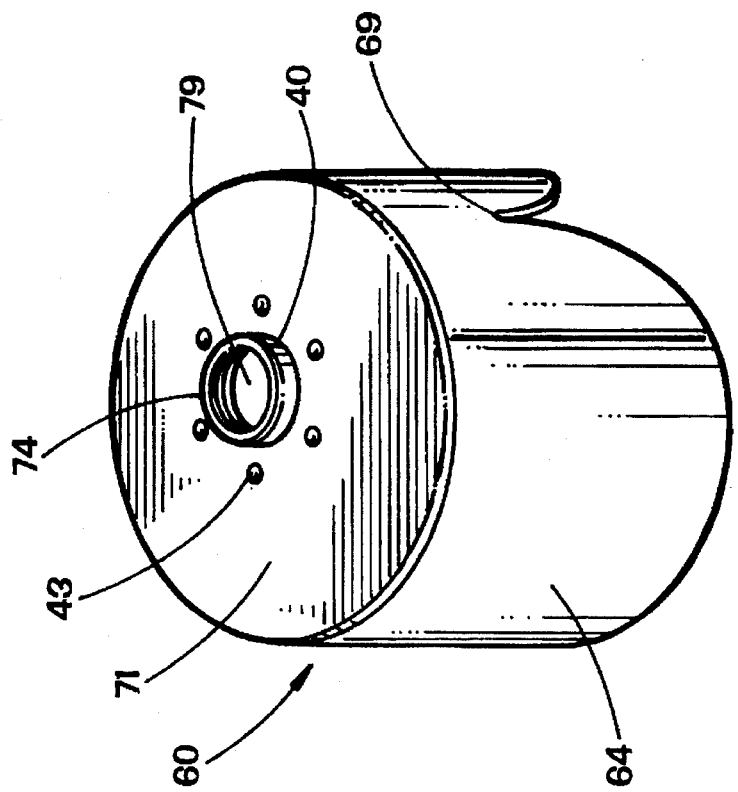
FIG. 4 is a second isometric view of the body illustrating an eccentric attachment means.

One embodiment of the present invention may be seen by reference to FIGS. 1–6. As illustrated therein, the present invention comprises an oversize can or cup holder adapted to slidably receive an oversized can or cup, or an insulated can or cup, thereby enabling the combination to be secured in a conventional receptacle, bracket, tray or rack 80.

By reference to FIGS. 1–6, there is shown a base 2 adapted to be coupled to a body 60 via a coupling means 35 in a manner specified below. By specific reference to the embodiment illustrated in FIGS. 1 and 2, base 2 in a preferred embodiment is generally cylindrical in shape and includes a partially closed top end 4 and an open bottom end 6. By reference to FIG. 2, base 2 is formed from cylindrical walls 7 defining a generally cylindrical bore 9 partially disposed therethrough ending in top end 4 as above described. Other embodiments of base 2 are also envisioned within the spirit of the invention. For example, base 2 may alternatively define two closed ends or be made from a solid piece of material.

Figure 6:
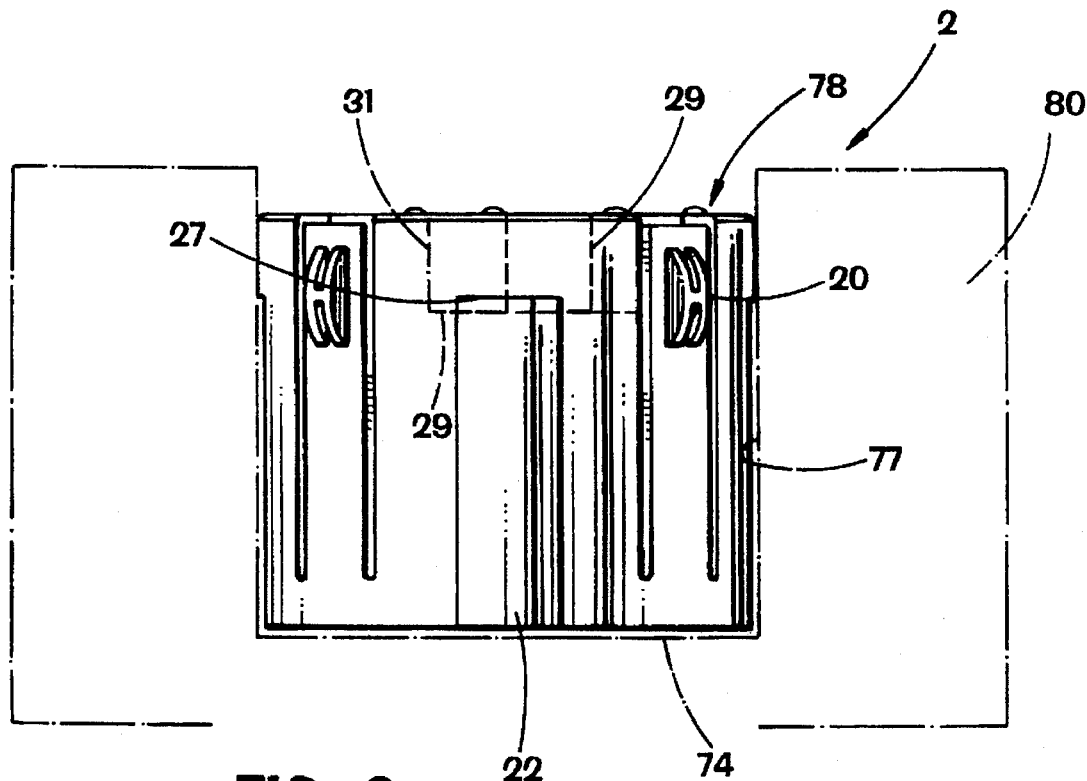
FIG. 6 is a side view of the mounting base of the embodiment illustrated in FIG.

In a preferred embodiment, base 2 is provided with means 11 to retain it in the cylindrical well or cup 78 of a beverage tray or rack 80 (See. FIG. 6). In the embodiment shown in FIGS. 1–2, means 11 includes one or more axially disposed flaps 3 formed integrally with base 2 and biased in an outward direction. Flaps 3 are receivable in cooperative grooves or slots 17 formed in walls 7. In such a fashion, flaps 3 exert an outward force when forced inwardly into slots 17 when base 2 is inserted into a receiving cup 78 of beverage tray 80. For this reason, it is preferable that base 2, and thus flaps 3, be formed of a resilient material, e.g. a deformable plastic, which retains a long term memory. Alternatively, it is envisioned that flaps 3 may be attached to base 2 via a conventional fastening means, e.g. riveting or gluing, such that base 2 and flap 3 need not be formed of the same material.

Figure 8:
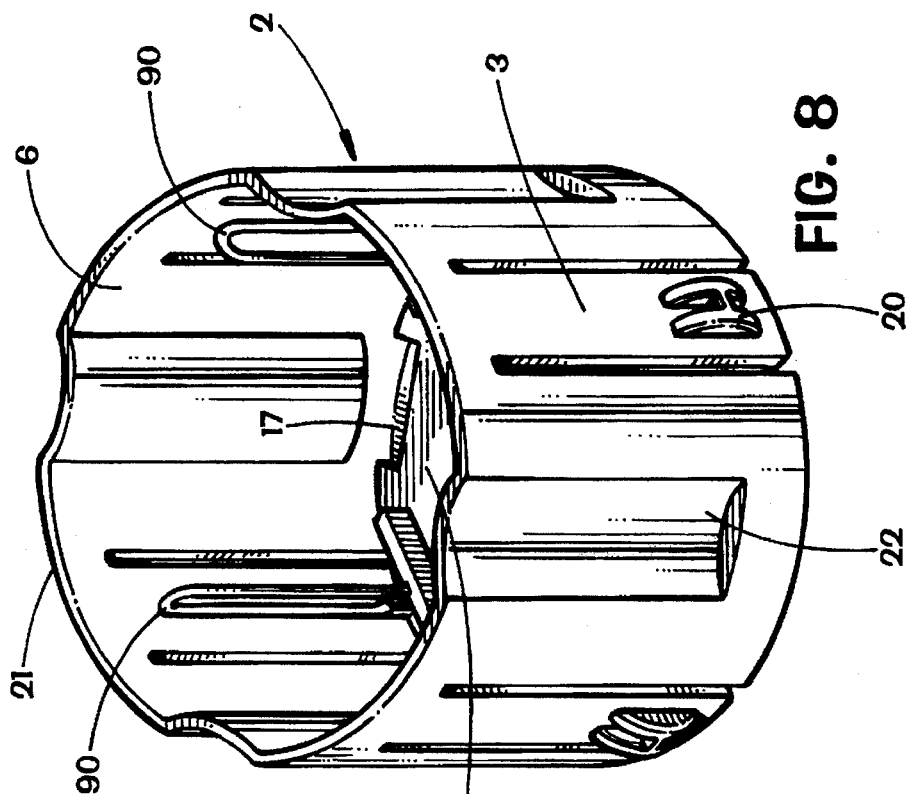
FIG. 8 is an isometric view of a second embodiment of the mounting base illustrated in FIG. 7.
Figure 7:
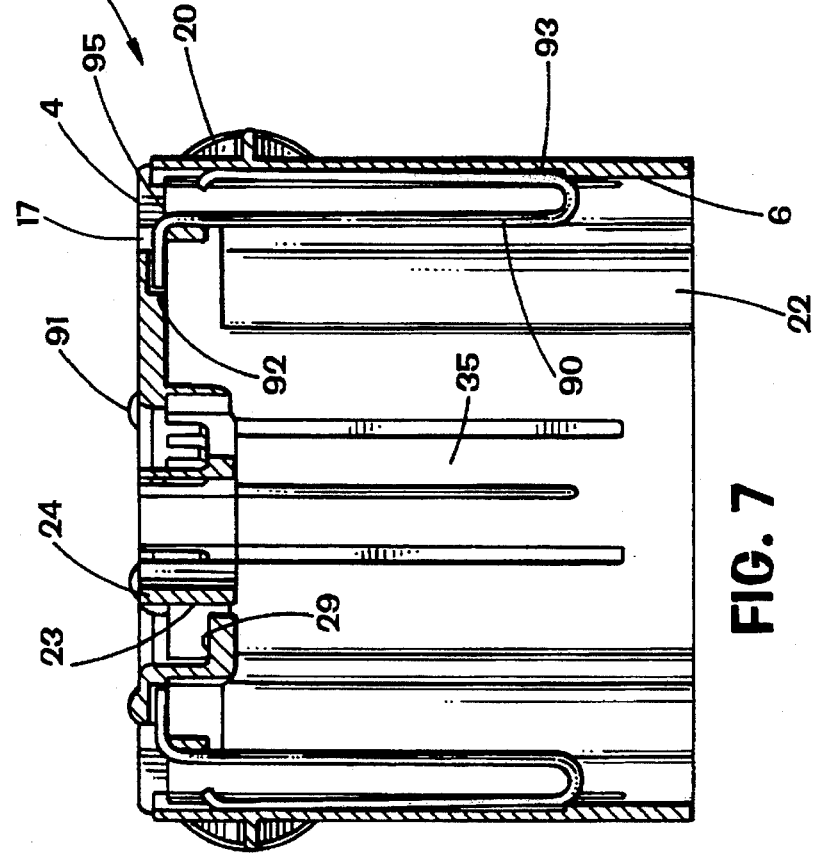
FIG. 7 is a side cutaway view of a second embodiment of the mounting base.

By reference to FIGS. 7–8, there is shown a second embodiment of the base 2 incorporating a discrete biasing element 90 secured to base 2 via a notch or groove 92 formed in bottom 4 as illustrated. Biasing elements 90 are situated in contacting relation to flaps 3 via a second formed groove 93. Element 90 is preferably formed of a resilient material, e.g. a spring steel, and describes a partial loop. Still alternatively, it is envisioned that other retention means may be used within the spirit of the invention. For example, it is possible to use a series of spring biased pistons (not shown) disposed along the circumference of base 2 to retain base 2 in rack 80. In each embodiment, however, it is desirable that the outward bias provided by such retention means be located at the uppermost end of base 2 in order to afford maximum stability for the holder of the present invention when secured in beverage tray 80.

By reference to FIGS. 1–2, flaps 3 of retention means 11 are further provided with outwardly extending protrusions 20 which contact the inner wall 77 of the cup 78 of beverage tray 80 and thus define point contact surfaces between the base 2 and surface 77 to contribute to the upright stability of the holder. In this connection, while significant stability may be attained by contact between the planar surface defined by the bottommost edges 21 of wall 7 and the bottom surface 74 of cup 78, protrusions 20 lend still additional stability and furthermore aid in stabilizing the beverage when the floor 74 or sides 77 of cup 78 are warped or irregular in shape or when base 2 does not extend sufficiently to settle flush with floor 74.

In the embodiment illustrated in FIGS. 1–2, walls 7 are further provided with one or more axially disposed indentations or grooves 22. Grooves 22 provide both a means of extracting the holder from the beverage tray 80 as well as providing a drainage path for any liquids which may be spilled from the beverage container 100 itself into cup 78.

By reference to FIGS. 1–6, coupling means 35 is comprised of two separate, detachable components formed in both base 2 and body 60. By specific reference to FIGS. 1–2 and 5–6, coupling means 35 includes a recessed circular shaft 23 having an upper end 24 and a lower end 27, where said lower end 27 merges with a recessed planar ring 29 defined about shaft 23. A concentrically disposed, annular bore 30 is thus formed in base 2, as illustrated, to receive a complementary configured shaft 40 as illustrated in FIG. 4 and as will be further discussed below, so as to allow rotation between base 2 and body 60.

In a preferred embodiment, shaft 23 is formed in two or more segments 37 integrally coupled to base 2. Such segmentation, in conjunction with the pliability of the separate elements 37 themselves, allow shaft 23 to be diametrically compressible during the joinder of base 2 and body 60 as will be discussed below. As illustrated in FIG. 1, the upper end 24 of each of the separate elements 37 defining shaft 23 is provided with an outwardly extending, downwardly tapered lip 33. This lip 33 serves as a mechanism to lock together base 2 and body 60, once the two are joined together, while allowing rotation therebetween.

Figure 3:
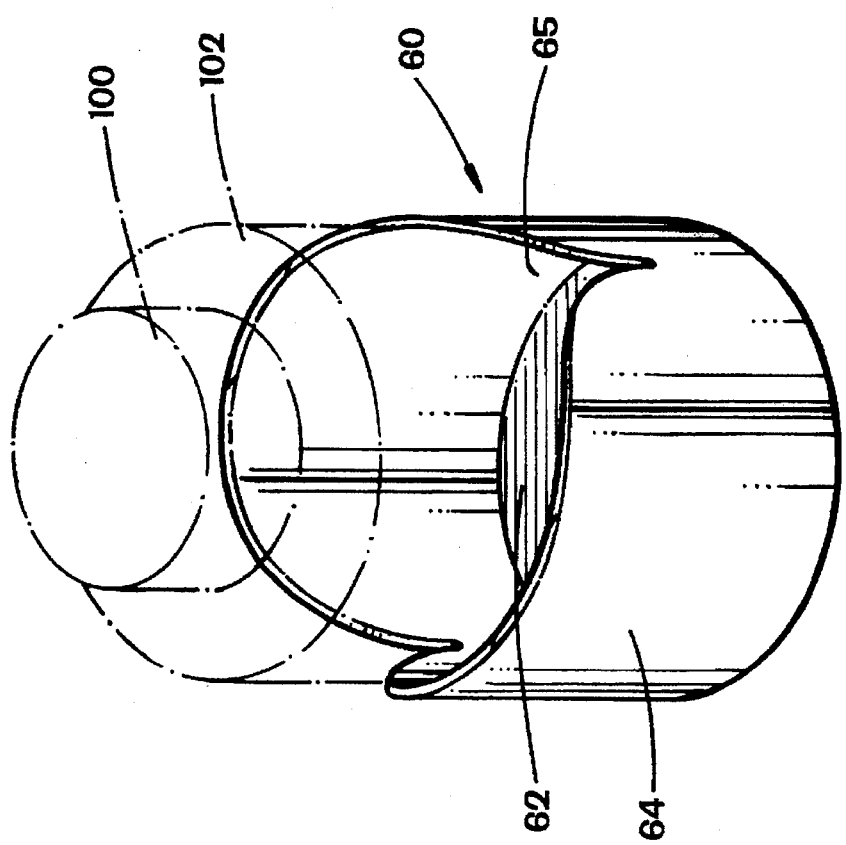
FIG. 3 is an isometric view of the body of one embodiment of the present invention.
Figure 5:
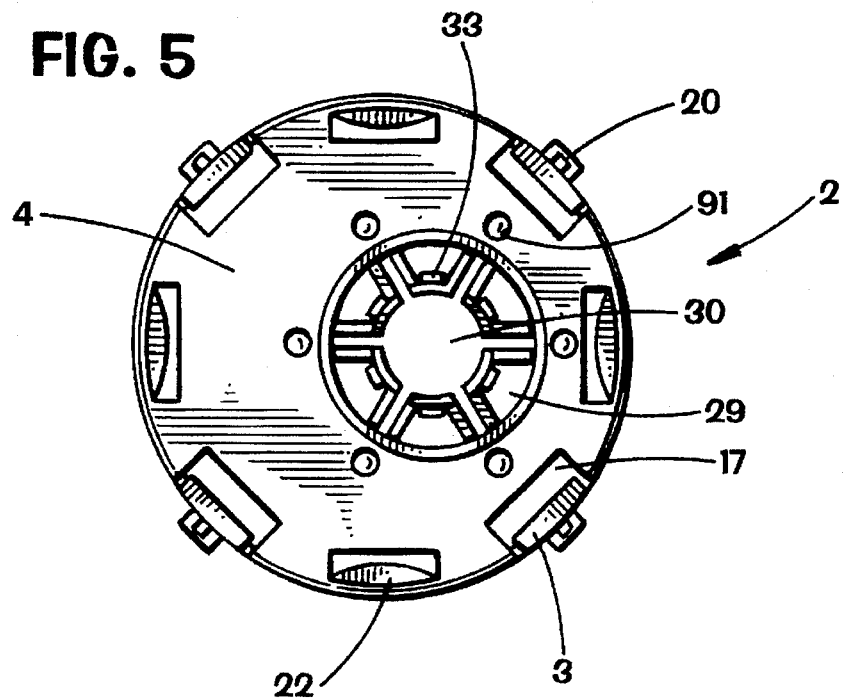
FIG. 5 is a top view of one embodiment of the mounting base of the present invention.

Referring to FIGS. 3–4, there is seen the body 60 which is generally cylindrical in shape and defines a base 62 and walls 64, where walls 64 define a circular bore 65 adapted to receive an oversized can or cup, or, as illustrated, a container 100 disposed within a removable insulation sleeve 102. In a preferred embodiment illustrated in FIG. 3–4, walls 64 define a cylindrical bore 65 having substantially identical diameters at their top and bottom ends. In an alternate embodiment, walls 64 may be inwardly tapered at their upper terminal ends so as to define a smaller upper diameter than that diameter defined at base 62. In such an alternate embodiment, walls 64 may be expanded by manipulation of the user when inserting a container in bore 65. Such expansion may be facilitated via one or more slots or grooves 69 formed in walls 64 as illustrated in the Figures in a clam shell arrangement so as to define independently moveable sections. The purpose of the above described alternate embodiment of walls 64 is to snugly retain container 100 when utilizing an insulation sleeve 102. As might be expected, such retention feature is especially helpful when the holder is used in a moving vehicle. This feature also provides for a snug fit with a variety of containers of varying diameters, particularly those containers defining a conical shape.

Other means are also envisioned within the spirit of the invention to accomplish the retention of a container 100. In yet another embodiment, the uppermost portion of wall 84 may be provided with a toothed or serrated edge in order to better grasp irregular or coned shaped containers.

By reference to FIG. 4, the bottom surface 71 of base 62 defines an axially disposed shaft 40 which is adapted to cooperate with shaft 23 and bore 30 as formed in base 2 and as described above. In the illustrated embodiment, shaft 40 is configured to fit around shaft 23, when compressed, and within cylindrical bore 30 such that the upper lip 74 of shaft 40 contacts planar ring 29. Similarly, surface 71 is brought into an abutting relationship with the upper surface 4 of base 2. Shaft 40 itself defines a cylindrical bore 79 therethrough adapted to receive shaft 23. Once shaft 23 is forced through bore 79 in shaft 40, the upper end 24 of each of the separate elements 37 defining shaft 23 expand outwardly, thereby securely locking shaft 23 in bore 79 via locking lips 33.

As described above, one difficulty presented by oversized holders is their inability to fit within a beverage rack or tray 80 which is secured to a wall or dash. This problem is addressed by the off-center placement of shaft 40 and cooperative shaft 23 which provides for the eccentric movement of body 60 via base 2. In such a fashion, conventionally sized beverage trays or racks may be utilized even when closely secured to a wall, dash or other attachment surface by rotating body 60 to an offset position vis-a-vis base 2 so as to provide the necessary clearance between body 60 and the attachment wall or dash.

It is envisioned that body 60 may be rotatably held in place via base 2 by the close fit therebetween. In one embodiment, the friction between the contact surfaces of base 2 and body 60 will serve to hold these elements in a relative pivotal relationship. Alternatively, the lowermost surface 71 of body 60 may be provided with a series of indentation, 43 which receive complementary/protrusion 91 formed in base 2. In such a fashion, a desired position between base 2 and body 60 may be maintained.

Although particular detailed embodiments of the apparatus and method have been described herein, it should be understood that the invention is not restricted to the details of the preferred embodiment. Many changes in design, composition, configuration and dimensions are possible without departing from the spirit and scope of the instant invention.

What is claimed is:

1. An adapter to allow an oversized container to be used in a beverage tray having recesses smaller than the diameter of the container comprising:

a cylindrically shaped base having an upper mounting surface and a lower surface, where said upper surface is provided with an eccentrically placed opening about which are concentrically situated a series of raised protrusions, where said opening is further provided with a first coupling means to couple said base to a body so as to allow for rotation therebetween, where said base includes an outwardly biased flange cooperative with a linear spring on said base and pivotable in a groove formed in said base; and said body adapted to receive said oversized container, where said body defines a cylindrical bore partially disposed therethrough and a mounting base, where the body is provided with a second means about mounting base cooperative with said coupling means to rotatably join together the base and body, where said second means is provided with a series of concentric apertures cooperative with the protrusions disposed on said base so as to rotatably lock the body in a desired position vis-a-vis said base.

2. The adapter of claim 1 wherein walls defining the bore of said body contain means to allow said walls to flex outwardly so as to accommodate containers of varying diameters.

3. The adapter of claim 2 wherein said flexing means includes at least one slot formed in walls defining the base.

4. The adapter of claim 1 wherein said first coupling means comprises a countersunk shaft concentrically disposed within a ring in said base so as to define an annulus.

5. The adapter of claim 4 wherein said shaft is comprised of a plurality of axially disposed, independently moveable elements defining a bottom and a top, where said bottom edge contacts said concentric ring and said top edge defines an outwardly projecting lip.

6. The adapter of claim 4 wherein said shaft is rotatably receivable in a second bore formed in said body.

7. The adapter of claim 1 wherein said base and said body are eccentrically joined together.

8. A device for stabilizing a container of a large base diameter in a cup-holder recess having a smaller diameter than the base of the container, said device comprising:

a tubular support base having a diameter slightly smaller than the diameter of the cup-holder recess, where said base is disposed about a longitudinal axis and includes a plurality of hingedly attached flanges in said base cooperative with at least one radially biased element on said base adapted to create a pressure between the base and the recess;

a body defining a cylindrical bore partially disposed therethrough of a diameter slightly greater than the diameter of the cup holder and an end piece, where said body is rotatably coupled to said base via a stem extending downwardly from said end piece, wherein said body defines a wall comprised of at least two independently moveable sections defined by at least one slit formed in said wall.

9. The device of claim 8 where said base is eccentrically rotatable vis-a-vis said body.

* * * * *